United States Patent [19]

Sasaki

[11] 4,197,969

[45] Apr. 15, 1980

[54] PAPER FEED MECHANISM

[75] Inventor: Masao Sasaki, Tokyo, Japan

[73] Assignee: Oki Electric Industry Co., Ltd., Tokyo, Japan

[21] Appl. No.: 910,389

[22] Filed: May 30, 1978

[30] Foreign Application Priority Data

Jun. 16, 1977 [JP] Japan ................................ 52-070484

[51] Int. Cl.[2] ................................................ G03B 1/24

[52] U.S. Cl. .................................. 226/79; 400/616.3; 64/DIG. 2; 74/243 R

[58] Field of Search ....................... 226/76, 79, 74, 75; 400/616-616.3; 64/DIG. 2, 27 R, 27 B, 27 LT, 27 C, 15 C; 271/117; 352/187; 74/243 R

[56] References Cited

U.S. PATENT DOCUMENTS

| | | | |
|---|---|---|---|
| 2,683,599 | 7/1954 | Davidson et al. | 226/79 |
| 3,549,068 | 12/1976 | Calano | 226/79 |

*Primary Examiner*—H. Grant Skaggs
*Attorney, Agent, or Firm*—Peter L. Berger

[57] ABSTRACT

Paper feed mechanism of a printer is disclosed for exactly transmitting rotative force of a drive shaft which interlocks a drive mechanism to a sprocket wheel which is provided for feeding a printing paper without play, and for locating and detaining the sprocket wheel at a desired position by an easy operation.

The above-said mechanism comprises a disc which is fixed to the sprocket wheel, a detaining knob which has a shaft hole for inserting the drive shaft and fitted rotatably to the disc via a pair of snap shafts, a C-shaped spring, one end of which is fixed to the disc, the other end to the detaining knob, for turning each of them conversely.

By these provisions, the inner circumference of the shaft hole which is provided at the center of the detaining knob comes into close contact with the drive shaft by the spreading force of the above-said C-shaped spring, therefore, the play between the shaft hole and the drive shaft is excluded to feed the printing paper exactly by the sprocket wheel and an improved printing quality can be obtained. Further to that, the sprocket wheel can easily be detained at desired position by turning the detaining knob against the force of the C-shaped spring.

4 Claims, 6 Drawing Figures

PAPER FEED MECHANISM

BACKGROUND OF THE INVENTION

A. Field of the Invention

The present invention relates to a paper feed mechanism of a printer, or more particularly, to a mechanism for exactly transmitting a rotative force of a drive shaft which interlocks a drive mechanism without play to a sprocket wheel for feeding a printing paper and for locating and detaining the sprocket wheel at a desired position by an easy operation.

B. Description of the Prior Art

As the processing speed in a central processing device of an electric computer has been increased, a high-speed printer has been correspondingly required, and a dot printer is put in use. For example, the dot printer represents a character on by dots such as a 7×9 dot configuration, and printing is carried out in such a manner that a printing paper which has sprocket holes is fed by a paper feed mechanism to a dot printing mechanism which is arranged at a right angle to the direction of the printing paper. The above-said paper feed mechanism has to exactly feed the printing paper to prevent an unevenness of pitch of dots which form a character and has to be easily operated when the printing paper is set.

In the prior art paper feed mechanism, there is play between the sprocket wheel which feeds the printing paper and the drive shaft for driving the sprocket wheel, therefore, the feeding of printing paper becomes unexact to cause an unevenness of pitch of dots, or in case of a matrix printer, an unevenness of a line feed pitch, and the printing quality is deteriorated. In addition, when the sprocket wheel is traversed in accordance with the width of the printing paper, the paper feed mechanism has difficulty handling this because the detaining mechanism comprises a screw.

SUMMARY OF THE INVENTION

The present invention is directed to a new mechanism of a paper feed mechanism of a printer for exactly transmitting a rotative force of a drive shaft which interlocks a drive mechanism to a sprocket wheel which feeds a printing paper without play and for locating and detaining the above-said sprocket wheel at a desired position by an easy operation.

The above-said mechanism comprises a disc which is fixed to the sprocket wheel, a detaining knob which has a shaft hole for inserting the drive shaft and fitted to the disc via a pair of snap shafts, and a C-shaped spring for turning each of them conversely.

The first object of the invention is to feed printing paper exactly by the sprocket wheel and to obtain an improved printing quality through bringing into close contact the inner circumference of the shaft hole which is provided at the center of the detaining knob with the drive shaft by a spreading force of a C-shaped spring to exclude play between the shaft hole and the drive shaft.

The second object of the invention is to hold the sproket wheel easily at a desired position through turning the above-said detaining knob against the force of the C-shaped spring.

The third object of the invention is to increase the contact force between the shaft hole and the drive shaft, namely the detaining force of the detaining knob, through forming the shaft hole, as shown in particular.

The above and further objects and novel features of the invention will more fully appear from the following detailed description when the same is read in connection with the accompanying drawings. It is to be expressly understood, however, that the drawings are for purpose of illustration only and are not intended as a definition of the invention.

DETAILED DESCRIPTION OF PREFERRED EMBODIMENTS

Figure 1:
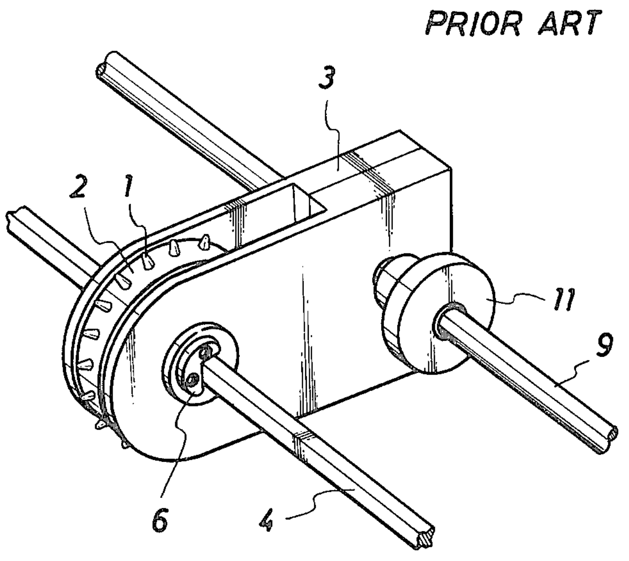
FIG. 1 is a perspective view of the prior art paper feed mechanism.
Figure 2:
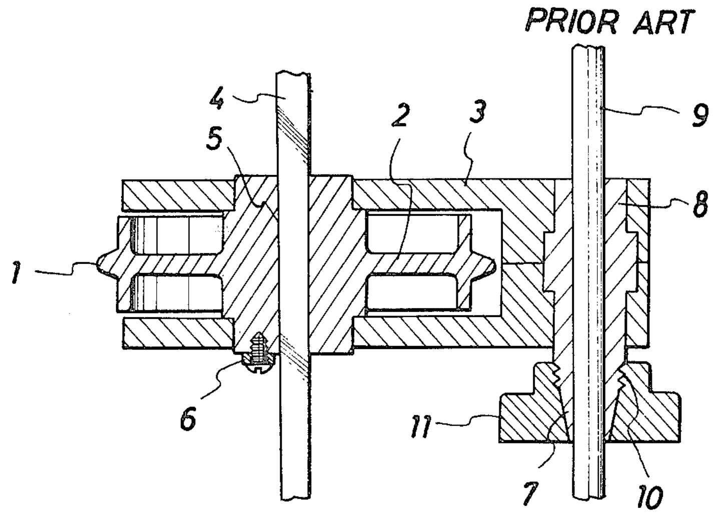
FIG. 2 is a horizontal sectional view of FIG. 1.

Prior to describing the present invention, the prior art paper feed mechanism is described with reference to FIGS. 1 and 2 for a better understanding of the present invention.

The prior art paper feed mechanism comprises a sprocket wheel 2 which has a plurality of sprocket pins 1 for inserting into sprocket holes of the printing paper and is rotatably attached to a frame 3, a square drive shaft 4 which is slidably inserted into a square hole 5 of the sprocket 2, a retainer 6 which is screwed to the sprocket wheel 2 in order to prevent play between the square hole 5 and the drive shaft 4, and by these provisions, the rotative force of the drive shaft 4 is transmitted to the sprocket wheel 2 to feed the printing paper.

But, the retainer 6 cannot satisfactorily prevent the play between the square hole 5 and the drive shaft 4 when the rotative force of the drive shaft 4 is transmitted to the sprocket wheel 2. Moreover, said play becomes greater on account of the frequent feeding and stopping of the printing paper and causes an inexact feeding of the printing paper, therefore, the printing quality is deteriorated through unevenness of pitch of dots which forms a character or of a line feed pitch. Furthermore, when the sprocket wheel 2 is traversed in accordance with the width of the printing paper, the frame 3 which supports the sprocket wheel 2 must be slid via a setting block 8 which has a collet portion 7 on the guide shaft 9, which is parallel to the drive shaft 4. The above-said frame 3 is detained through binding above-said collet portion 7 by a clamp knob 11 which has a screw portion 10. The operation such as turning and screwing down the clamp knob 11 is troublesome as well as difficult in handling.

Figure 3:
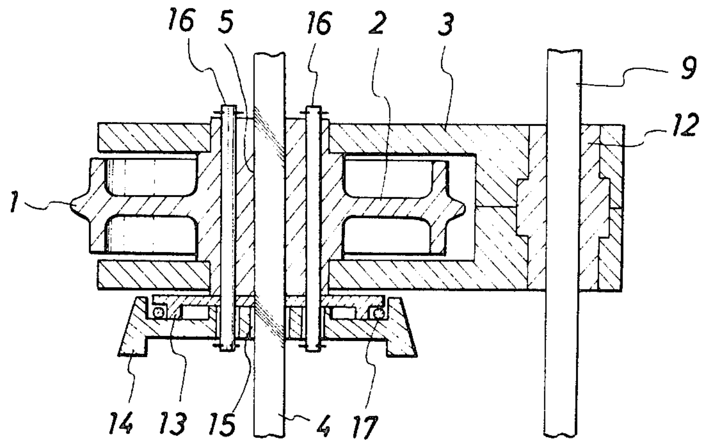
FIG. 3 is a horizontal sectional view of a paper feed mechanism according to an embodiment of the present invention.
Figure 4:
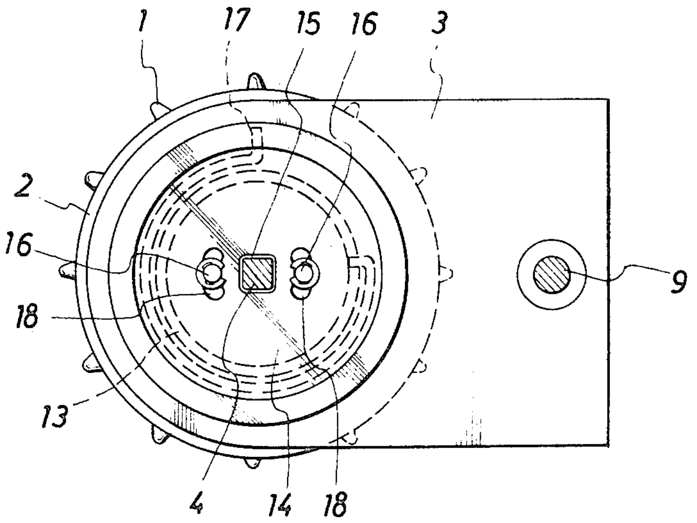
FIG. 4 is a side elevation of FIG. 3.

Referring now to FIGS. 3 and 4, the present invention for settling the above-said defects is described.

In these figures, numeral 2 indicates a sprocket wheel which has a plurality of sprocket pins 1 for feeding the printing paper which has sprocket holes, numeral 4 indicates a square drive shaft for rotating the sprocket wheel 2 in accordance with a drive mechanism not shown, numeral 3 indicates a frame for rotatably supporting the sprocket wheel 2, numeral 9 indicates a guide shaft for slidably supporting said frame 3 via a guide block 12. Next, as clearly shown in FIG. 3, numeral 13 indicates a disc which is fixed to the sprocket wheel 2, numeral 14 indicates a detaining knob which has a shaft hole 15 for inserting a drive shaft 4 and is rotatably fitted to said disc 13 via a pair of snap shafts 16, numeral 17 indicates a C-shaped spring, one end of which is fixed to the disc 13, the other end to the detaining knob 14, for turning each of them conversely. Said C-shaped spring is so-called a C-shaped spreading spring for rendering to each the sprocket wheel 2 and the detaining knob 14 a rotative force about the drive shaft 4. In FIG. 4, the square hole 15 of the detaining knob 14 is rotated respectively in a clockwise or a counter-clockwise direction and is brought into close contact with the drive shaft 4. The detaining knob 14 is rotatable about the shaft hole 15 with the aid of the pair of snap shafts 16, but is closely fitted to the disc 13 in an axial direction and is formed such that an operater can easily operate it in a manual manner. The guide block 12 is slidable along the guide shaft 9, but is incapable of performing a holding action.

Next, the operation of the above-said paper feed mechanism is now described. First, regarding the transmission of the rotative force of the drive shaft 4, the sprocket wheel 2 is, in FIG. 4, turned in a clockwise direction by the spreading force of the C-shaped spring 17 and comes into close contact with the drive shaft 4 which is driven in a counter-clockwise direction without a backlash to drive the sprocket wheel 2 in a counter-clockwise direction. On the contrary, in case that the drive shaft 4 is driven in a clockwise direction, the sprocket wheel 2 comes into close contact with the drive shaft 4 at all times on condition that the spreading force of the C-shaped spring 17 is set on a large scale. As described, the sprocket pins 1 on the sprocket wheel 2 can steadily feed the printing paper in a clockwise or a counter-clockwise direction. For this reason, the unevenness of pitch of dots which represents a character or of the line feed pitch can be prevented.

In case of changing the detaining position of the sprocket wheel in accordance with the width of the printing paper, an operater may turn the detaining knob against the spreading force of the C-shaped spring to release the close contact between the shaft hole and the drive shaft, thereby the frame to which the sprocket wheel is attached becomes slidable about the drive shaft and the guide shaft, and may be moved to a desired position. If the detaining knob is released, the shaft hole comes into close contact with the drive shaft by the spreading force of the C-shaped spring and an operator can detain the sprocket wheel which is attached to the frame at desired position by this easy operation.

As described, in the paper feed mechanism of the present invention, the detaining knob which is thrusted by the spreading force of the C-shaped spring is rotatably fitted to the sprocket wheel via the disc in order to bring the shaft hole of the detaining knob into close contact with the drive shaft, thereby, the rotative force of the drive shaft can be transmitted to the sprocket wheel without play, and the unevenness of the pitch of dots which form a character or of the line feed pitch can be prevented, and an improved printing quality is obtained. Moreover, the frame which supports the sprocket wheel can easily be slid along the drive shaft and the guide shaft by releasing the contact between the shaft hole and the drive shaft against the force of the C-shaped spring, and the sprocket wheel can be detained at a desired position by releasing the detaining knob.

Figure 5:
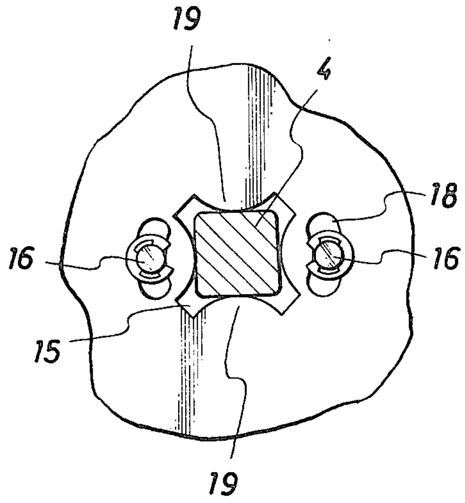
FIG. 5 is a partial diagrammatic view according to an embodiment of the invention in which a shaft hole of a detaining knob comprises four circular arc cams.

In the above-described embodiment, the shaft hole 15 of the detaining knob 14 is square in correspondence to the square drive shaft 4. But the shaft hole 15 may be formed as shown in FIG. 5 in order to increase the contact force between the drive shaft 4 and the shaft hole 15, moreover, in order to increase the axial friction force between them which is proportional to said contact force, namely the detaining force of the detaining knob 14. In FIG. 5, the shaft hole 15 comprises four circular arc cams 19 which expand the arc to the inside of the shaft hole 15, and an optional point of the circular arc cam 19 strikes the drive shaft 4.

Figure 6:
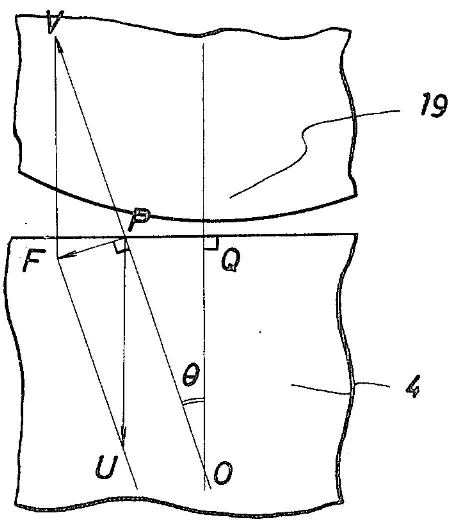
FIG. 6 is a vector diagram illustrating the contact force between the shaft hole and the drive shaft of FIG. 5.

FIG. 6 is a vector diagram illustrating the contact force between the shaft hole 15 and the drive shaft 4 in FIG. 5. If, by the spreading force of the C-shaped spring 17, the detaining knob 14 which has the shaft hole 15 strikes the drive shaft 4 at point C after being turned by an angle $\theta$ around the center O of the drive shaft 4, the rotational force F which is generated by the spreading force of the C-shaped spring 17 may be divided into a component U which contributes to the friction force between the shaft hole 15 and the drive shaft 4, namely the detaining force of the detaining knob 14, and a component V which does not contribute to the friction force. ($R=\mu U$, where R is a friction force, $\mu$ a friction coefficient).

The relationship between the components U and V can be expressed by the following formula:

$$U=F/\sin\theta$$

and moreover, if Q represents a point on the surface of the drive shaft 4 as well as on the perpendicular from the center C, the above-said sin $\theta$ can be expressed by following formula:

$$\sin\theta=\frac{\overline{PQ}}{\overline{OP}}\approx\frac{\overline{PQ}}{\overline{OQ}}$$

Since, the shorter the distance $\overline{PQ}$ is, namely the nearer the point P comes to the point Q, the greater the detaining force becomes.

The section of the drive shaft 4 may not be necessarily square, it may be shaped, for example, like a spline shaft with a exception of a circle, and the square hole 5 as well as the shaft hole 15 shall be shaped in compliance with the section. Besides, the detaining knob 14 and the disc 13 may well be shaped otherwise.

While there have been shown and described and pointed out the fundamental novel features of the invention as applied to a preferred embodiment, it will be understood that the various omissions and substitutions and changes in the form and details of the mechanism illustrated and its operation may be made those skilled in the art without departing from the spirit of the invention.

What is claimed is:

1. In a paper feed mechanism comprising a sprocket wheel which has a plurality of sprocket pins for feeding a printing paper, a drive shaft for rotating the sprocket wheel, a frame for rotatably supporting the sprocket wheel, a guide shaft for slidably supporting the frame, the improvement comprising: a disc which is fixed to the sprocket wheel, a detaining knob which has a shaft hole for inserting the drive shaft and is rotatably fitted to the disc, a spring having one end fixed to the disc and, the other end fixed to the detaining knob for rotating each of them conversely about the drive shaft, the peripheral wall defining said shaft hole providing a close fit with the drive shaft to transmit the rotative force of the drive shaft to the sprocket wheel without play, as well as to detain the sprocket wheel at a desired position by operating the detaining knob.

2. The invention of claim 1, wherein said spring comprises a C-shaped spring.

3. The invention of claim 1, comprising a pair of snap shafts for rotatably connecting said detaining knob to said disc.

4. The invention of claim 1, wherein the peripheral wall defining said shaft hole is constructed of four arc shaped cams located on each of four generally rectangular sides of said shaft hole, each of said sides having the arc of the respective cam inwardly oriented.

* * * * *